(12) United States Patent
Feick et al.

(10) Patent No.: US 8,270,064 B2
(45) Date of Patent: Sep. 18, 2012

(54) ELECTROPHORETIC PARTICLES, AND PROCESSES FOR THE PRODUCTION THEREOF

(75) Inventors: Jason D. Feick, Auburndale, MA (US); Michael D. Walls, Dorchester, MA (US); Michael D. Musick, Mason, OH (US)

(73) Assignee: E Ink Corporation, Cambridge, MA (US)

( * ) Notice: Subject to any disclaimer, the term of this patent is extended or adjusted under 35 U.S.C. 154(b) by 192 days.

(21) Appl. No.: 12/702,566

(22) Filed: Feb. 9, 2010

(65) Prior Publication Data

US 2010/0289736 A1    Nov. 18, 2010

Related U.S. Application Data

(60) Provisional application No. 61/150,827, filed on Feb. 9, 2009.

(51) Int. Cl.
G02B 26/00 (2006.01)
G09G 3/34 (2006.01)

(52) U.S. Cl. ........................... 359/296; 345/107
(58) Field of Classification Search .................. 359/296; 345/107; 430/32; 204/600
See application file for complete search history.

(56) References Cited

U.S. PATENT DOCUMENTS

| | | |
|---|---|---|
| 3,668,106 A | 6/1972 | Ota |
| 3,756,693 A | 9/1973 | Ota |
| 3,767,392 A | 10/1973 | Ota |
| 3,792,308 A | 2/1974 | Ota |
| 3,870,517 A | 3/1975 | Ota et al. |
| 3,892,568 A | 7/1975 | Ota |
| 4,418,346 A | 11/1983 | Batchelder |
| 5,745,094 A | 4/1998 | Gordon, II et al. |
| 5,760,761 A | 6/1998 | Sheridon |
| 5,777,782 A | 7/1998 | Sheridon |
| 5,808,783 A | 9/1998 | Crowley |
| 5,872,552 A | 2/1999 | Gordon, II et al. |
| 5,930,026 A | 7/1999 | Jacobson et al. |
| 5,961,804 A | 10/1999 | Jacobson et al. |
| 6,017,584 A | 1/2000 | Albert et al. |
| 6,054,071 A | 4/2000 | Mikkelsen, Jr. |
| 6,055,091 A | 4/2000 | Sheridon et al. |
| 6,067,185 A | 5/2000 | Albert et al. |
| 6,097,531 A | 8/2000 | Sheridon |

(Continued)

FOREIGN PATENT DOCUMENTS

EP    1 099 207 B1    3/2002

(Continued)

OTHER PUBLICATIONS

Amundson, K., "Electrophoretic Imaging Films for Electronic Paper Displays" in Crawford, G. ed. Flexible Flat Panel Displays, John Wiley & Sons, Ltd., Hoboken, NJ: 2005.

(Continued)

*Primary Examiner* — William Choi
(74) *Attorney, Agent, or Firm* — David J. Cole (57) ABSTRACT

An electrophoretic medium comprises at least one electrically charged particle dispersed posed in a fluid. The electrically charged particle comprises an inorganic black pigment having a surface area of at least about 7 $m^2/g$. Preferred pigments are magnetite and mixed metal oxides containing two or more of iron, chromium, nickel, manganese, copper and cobalt, for example copper iron manganese oxide spinel and copper chromium manganese oxide spinel. The inorganic black pigment may bear a polymer coating.

20 Claims, 3 Drawing Sheets

U.S. PATENT DOCUMENTS

| | | | |
|---|---|---|---|
| 6,118,426 A | 9/2000 | Albert et al. | |
| 6,120,588 A | 9/2000 | Jacobson | |
| 6,120,839 A | 9/2000 | Comiskey et al. | |
| 6,124,851 A | 9/2000 | Jacobson | |
| 6,128,124 A | 10/2000 | Silverman | |
| 6,130,773 A | 10/2000 | Jacobson et al. | |
| 6,130,774 A | 10/2000 | Albert et al. | |
| 6,137,467 A | 10/2000 | Sheridon et al. | |
| 6,144,361 A | 11/2000 | Gordon, II et al. | |
| 6,147,791 A | 11/2000 | Sheridon | |
| 6,172,798 B1 | 1/2001 | Albert et al. | |
| 6,177,921 B1 | 1/2001 | Comiskey et al. | |
| 6,184,856 B1 | 2/2001 | Gordon, II et al. | |
| 6,225,971 B1 | 5/2001 | Gordon, II et al. | |
| 6,232,950 B1 | 5/2001 | Albert et al. | |
| 6,241,921 B1 | 6/2001 | Jacobson et al. | |
| 6,249,271 B1 | 6/2001 | Albert et al. | |
| 6,252,564 B1 | 6/2001 | Albert et al. | |
| 6,262,706 B1 | 7/2001 | Albert et al. | |
| 6,262,833 B1 | 7/2001 | Loxley et al. | |
| 6,271,823 B1 | 8/2001 | Gordon, II et al. | |
| 6,300,932 B1 | 10/2001 | Albert | |
| 6,301,038 B1 | 10/2001 | Fitzmaurice et al. | |
| 6,312,304 B1 | 11/2001 | Duthaler et al. | |
| 6,312,971 B1 | 11/2001 | Amundson et al. | |
| 6,323,989 B1 | 11/2001 | Jacobson et al. | |
| 6,327,072 B1 | 12/2001 | Comiskey et al. | |
| 6,376,828 B1 | 4/2002 | Comiskey | |
| 6,377,387 B1 | 4/2002 | Duthaler et al. | |
| 6,392,785 B1 | 5/2002 | Albert et al. | |
| 6,392,786 B1 | 5/2002 | Albert | |
| 6,413,790 B1 | 7/2002 | Duthaler et al. | |
| 6,422,687 B1 | 7/2002 | Jacobson | |
| 6,445,374 B2 | 9/2002 | Albert et al. | |
| 6,445,489 B1 | 9/2002 | Jacobson et al. | |
| 6,459,418 B1 | 10/2002 | Comiskey et al. | |
| 6,473,072 B1 | 10/2002 | Comiskey et al. | |
| 6,480,182 B2 | 11/2002 | Turner et al. | |
| 6,498,114 B1 | 12/2002 | Amundson et al. | |
| 6,504,524 B1 | 1/2003 | Gates et al. | |
| 6,506,438 B2 | 1/2003 | Duthaler et al. | |
| 6,512,354 B2 | 1/2003 | Jacobson et al. | |
| 6,515,649 B1 | 2/2003 | Albert et al. | |
| 6,518,949 B2 | 2/2003 | Drzaic | |
| 6,521,489 B2 | 2/2003 | Duthaler et al. | |
| 6,531,997 B1 | 3/2003 | Gates et al. | |
| 6,535,197 B1 | 3/2003 | Comiskey et al. | |
| 6,538,801 B2 | 3/2003 | Jacobson et al. | |
| 6,545,291 B1 | 4/2003 | Amundson et al. | |
| 6,580,545 B2 | 6/2003 | Morrison et al. | |
| 6,639,578 B1 | 10/2003 | Comiskey et al. | |
| 6,652,075 B2 | 11/2003 | Jacobson | |
| 6,657,772 B2 | 12/2003 | Loxley | |
| 6,664,944 B1 | 12/2003 | Albert et al. | |
| D485,294 S | 1/2004 | Albert | |
| 6,672,921 B1 | 1/2004 | Liang et al. | |
| 6,680,725 B1 | 1/2004 | Jacobson | |
| 6,683,333 B2 | 1/2004 | Kazlas et al. | |
| 6,693,620 B1 | 2/2004 | Herb et al. | |
| 6,704,133 B2 | 3/2004 | Gates et al. | |
| 6,710,540 B1 | 3/2004 | Albert et al. | |
| 6,721,083 B2 | 4/2004 | Jacobson et al. | |
| 6,724,519 B1 | 4/2004 | Comiskey et al. | |
| 6,727,881 B1 | 4/2004 | Albert et al. | |
| 6,738,050 B2 | 5/2004 | Comiskey et al. | |
| 6,750,473 B2 | 6/2004 | Amundson et al. | |
| 6,753,999 B2 | 6/2004 | Zehner et al. | |
| 6,788,449 B2 | 9/2004 | Liang et al. | |
| 6,816,147 B2 | 11/2004 | Albert | |
| 6,819,471 B2 | 11/2004 | Amundson et al. | |
| 6,822,782 B2 | 11/2004 | Honeyman et al. | |
| 6,825,068 B2 | 11/2004 | Denis et al. | |
| 6,825,829 B1 | 11/2004 | Albert et al. | |
| 6,825,970 B2 | 11/2004 | Goenaga et al. | |
| 6,831,769 B2 | 12/2004 | Holman et al. | |
| 6,839,158 B2 | 1/2005 | Albert et al. | |
| 6,842,167 B2 | 1/2005 | Albert et al. | |
| 6,842,279 B2 | 1/2005 | Amundson | |
| 6,842,657 B1 | 1/2005 | Drzaic et al. | |
| 6,864,875 B2 | 3/2005 | Drzaic et al. | |
| 6,865,010 B2 | 3/2005 | Duthaler et al. | |
| 6,866,760 B2 | 3/2005 | Paolini, Jr. et al. | |
| 6,870,657 B1 | 3/2005 | Fitzmaurice et al. | |
| 6,870,661 B2 | 3/2005 | Pullen et al. | |
| 6,900,851 B2 | 5/2005 | Morrison et al. | |
| 6,922,276 B2 | 7/2005 | Zhang et al. | |
| 6,950,220 B2 | 9/2005 | Abramson et al. | |
| 6,958,848 B2 | 10/2005 | Cao et al. | |
| 6,967,640 B2 | 11/2005 | Albert et al. | |
| 6,980,196 B1 | 12/2005 | Turner et al. | |
| 6,982,178 B2 | 1/2006 | LeCain et al. | |
| 6,987,603 B2 | 1/2006 | Paolini, Jr. et al. | |
| 6,995,550 B2 | 2/2006 | Jacobson et al. | |
| 7,002,728 B2 * | 2/2006 | Pullen et al. | 359/296 |
| 7,012,600 B2 | 3/2006 | Zehner et al. | |
| 7,012,735 B2 | 3/2006 | Honeyman et al. | |
| 7,023,420 B2 | 4/2006 | Comiskey et al. | |
| 7,030,412 B1 | 4/2006 | Drzaic et al. | |
| 7,030,854 B2 | 4/2006 | Baucom et al. | |
| 7,034,783 B2 | 4/2006 | Gates et al. | |
| 7,038,655 B2 | 5/2006 | Herb et al. | |
| 7,061,663 B2 | 6/2006 | Cao et al. | |
| 7,071,913 B2 | 7/2006 | Albert et al. | |
| 7,075,502 B1 | 7/2006 | Drzaic et al. | |
| 7,075,703 B2 | 7/2006 | O'Neil et al. | |
| 7,079,305 B2 | 7/2006 | Paolini, Jr. et al. | |
| 7,106,296 B1 | 9/2006 | Jacobson | |
| 7,109,968 B2 | 9/2006 | Albert et al. | |
| 7,110,163 B2 | 9/2006 | Webber et al. | |
| 7,110,164 B2 | 9/2006 | Paolini, Jr. et al. | |
| 7,116,318 B2 | 10/2006 | Amundson et al. | |
| 7,116,466 B2 | 10/2006 | Whitesides et al. | |
| 7,119,759 B2 | 10/2006 | Zehner et al. | |
| 7,119,772 B2 | 10/2006 | Amundson et al. | |
| 7,148,128 B2 | 12/2006 | Jacobson | |
| 7,167,155 B1 | 1/2007 | Albert et al. | |
| 7,170,670 B2 | 1/2007 | Webber | |
| 7,173,752 B2 | 2/2007 | Doshi et al. | |
| 7,176,880 B2 | 2/2007 | Amundson et al. | |
| 7,180,649 B2 | 2/2007 | Morrison et al. | |
| 7,190,008 B2 | 3/2007 | Amundson et al. | |
| 7,193,625 B2 | 3/2007 | Danner et al. | |
| 7,202,847 B2 | 4/2007 | Gates | |
| 7,202,991 B2 | 4/2007 | Zhang et al. | |
| 7,206,119 B2 | 4/2007 | Honeyman et al. | |
| 7,223,672 B2 | 5/2007 | Kazlas et al. | |
| 7,230,750 B2 | 6/2007 | Whitesides et al. | |
| 7,230,751 B2 | 6/2007 | Whitesides et al. | |
| 7,236,290 B1 | 6/2007 | Zhang et al. | |
| 7,236,291 B2 | 6/2007 | Kaga et al. | |
| 7,236,292 B2 | 6/2007 | LeCain et al. | |
| 7,242,513 B2 | 7/2007 | Albert et al. | |
| 7,247,379 B2 | 7/2007 | Pullen et al. | |
| 7,256,766 B2 | 8/2007 | Albert et al. | |
| 7,259,744 B2 | 8/2007 | Arango et al. | |
| 7,280,094 B2 | 10/2007 | Albert | |
| 7,304,634 B2 | 12/2007 | Albert et al. | |
| 7,304,787 B2 | 12/2007 | Whitesides et al. | |
| 7,312,784 B2 | 12/2007 | Baucom et al. | |
| 7,312,794 B2 | 12/2007 | Zehner et al. | |
| 7,312,916 B2 | 12/2007 | Pullen et al. | |
| 7,321,459 B2 | 1/2008 | Masuda et al. | |
| 7,327,511 B2 | 2/2008 | Whitesides et al. | |
| 7,339,715 B2 | 3/2008 | Webber et al. | |
| 7,349,148 B2 | 3/2008 | Doshi et al. | |
| 7,352,353 B2 | 4/2008 | Albert et al. | |
| 7,365,394 B2 | 4/2008 | Denis et al. | |
| 7,365,733 B2 | 4/2008 | Duthaler et al. | |
| 7,375,875 B2 | 5/2008 | Whitesides et al. | |
| 7,382,363 B2 | 6/2008 | Albert et al. | |
| 7,388,572 B2 | 6/2008 | Duthaler et al. | |
| 7,391,555 B2 | 6/2008 | Albert et al. | |
| 7,411,719 B2 | 8/2008 | Paolini, Jr. et al. | |
| 7,411,720 B2 | 8/2008 | Honeyman et al. | |
| 7,420,549 B2 | 9/2008 | Jacobson et al. | |
| 7,442,587 B2 | 10/2008 | Amundson et al. | |
| 7,443,571 B2 | 10/2008 | LeCain et al. | |

| | | |
|---|---|---|
| 7,453,445 B2 | 11/2008 | Amundson |
| 7,492,339 B2 | 2/2009 | Amundson |
| 7,492,497 B2 | 2/2009 | Paolini, Jr. et al. |
| 7,513,813 B2 | 4/2009 | Paolini, Jr. et al. |
| 7,528,822 B2 | 5/2009 | Amundson et al. |
| 7,532,388 B2 | 5/2009 | Whitesides et al. |
| 7,535,624 B2 | 5/2009 | Amundson et al. |
| 7,545,358 B2 | 6/2009 | Gates et al. |
| 7,551,346 B2 | 6/2009 | Fazel et al. |
| 7,554,712 B2 | 6/2009 | Patry et al. |
| 7,561,324 B2 | 7/2009 | Duthaler et al. |
| 7,583,251 B2 | 9/2009 | Arango et al. |
| 7,583,427 B2 | 9/2009 | Danner et al. |
| 7,598,173 B2 | 10/2009 | Ritenour et al. |
| 7,602,374 B2 | 10/2009 | Zehner et al. |
| 7,605,799 B2 | 10/2009 | Amundson et al. |
| 7,636,191 B2 | 12/2009 | Duthaler |
| 7,649,666 B2 | 1/2010 | Isobe et al. |
| 7,649,674 B2 | 1/2010 | Danner et al. |
| 7,656,576 B2 | 2/2010 | Suwabe et al. |
| 7,667,684 B2 | 2/2010 | Jacobson et al. |
| 7,667,886 B2 | 2/2010 | Danner et al. |
| 7,672,040 B2 | 3/2010 | Sohn et al. |
| 7,678,862 B2 | 3/2010 | Minami |
| 7,679,599 B2 | 3/2010 | Kawai |
| 7,679,814 B2 | 3/2010 | Paolini et al. |
| 7,688,297 B2 | 3/2010 | Zehner et al. |
| 7,688,497 B2 | 3/2010 | Danner et al. |
| 7,705,824 B2 | 4/2010 | Baucom et al. |
| 7,728,811 B2 | 6/2010 | Albert et al. |
| 7,729,039 B2 | 6/2010 | LeCain et al. |
| 7,733,311 B2 | 6/2010 | Amundson et al. |
| 7,733,335 B2 | 6/2010 | Zehner et al. |
| 7,733,554 B2 | 6/2010 | Danner et al. |
| 7,746,544 B2 | 6/2010 | Comiskey et al. |
| 7,785,988 B2 | 8/2010 | Amundson et al. |
| 7,787,169 B2 | 8/2010 | Abramson et al. |
| 7,791,782 B2 | 9/2010 | Paolini et al. |
| 7,791,789 B2 | 9/2010 | Albert et al. |
| 7,826,129 B2 | 11/2010 | Wu et al. |
| 7,839,564 B2 | 11/2010 | Whitesides et al. |
| 7,843,621 B2 | 11/2010 | Danner et al. |
| 7,843,624 B2 | 11/2010 | Danner et al. |
| 7,843,626 B2 | 11/2010 | Amundson et al. |
| 7,848,006 B2 | 12/2010 | Wilcox et al. |
| 7,848,007 B2 | 12/2010 | Paolini, Jr. et al. |
| 7,859,637 B2 | 12/2010 | Amundson et al. |
| 7,893,435 B2 | 2/2011 | Kazlas et al. |
| 7,898,717 B2 | 3/2011 | Patry et al. |
| 7,903,319 B2 | 3/2011 | Honeyman et al. |
| 7,910,175 B2 | 3/2011 | Webber et al. |
| 7,952,557 B2 | 5/2011 | Amundson et al. |
| 7,952,790 B2 | 5/2011 | Honeyman et al. |
| 7,956,841 B2 | 6/2011 | Albert et al. |
| 7,957,053 B2 | 6/2011 | Honeyman et al. |
| 7,986,450 B2 | 7/2011 | Cao et al. |
| 7,999,787 B2 | 8/2011 | Amundson et al. |
| 8,009,344 B2 | 8/2011 | Danner et al. |
| 8,009,348 B2 | 8/2011 | Zehner et al. |
| 8,018,640 B2 | 9/2011 | Whitesides et al. |
| 8,027,081 B2 | 9/2011 | Danner et al. |
| 8,034,209 B2 | 10/2011 | Danner et al. |
| 8,035,886 B2 | 10/2011 | Jacobson |
| 8,049,947 B2 | 11/2011 | Danner et al. |
| 8,054,526 B2 | 11/2011 | Bouchard |
| 8,064,962 B2 | 11/2011 | Wilcox et al. |
| 8,077,141 B2 | 12/2011 | Duthaler et al. |
| 8,089,453 B2 | 1/2012 | Comiskey et al. |
| 8,098,418 B2 | 1/2012 | Paolini et al. |
| 2002/0060321 A1 | 5/2002 | Kazlas et al. |
| 2002/0090980 A1 | 7/2002 | Wilcox et al. |
| 2003/0102858 A1 | 6/2003 | Jacobson et al. |
| 2004/0105036 A1 | 6/2004 | Danner et al. |
| 2004/0112750 A1 | 6/2004 | Jacobson et al. |
| 2004/0119681 A1 | 6/2004 | Albert et al. |
| 2004/0263947 A1 | 12/2004 | Drzaic et al. |
| 2005/0012980 A1 | 1/2005 | Wilcox et al. |
| 2005/0122284 A1 | 6/2005 | Gates et al. |
| 2005/0122306 A1 | 6/2005 | Wilcox et al. |
| 2005/0122563 A1 | 6/2005 | Honeyman et al. |
| 2005/0156340 A1 | 7/2005 | Valianatos et al. |
| 2005/0179642 A1 | 8/2005 | Wilcox et al. |
| 2005/0253777 A1 | 11/2005 | Zehner et al. |
| 2005/0259068 A1 | 11/2005 | Nihei et al. |
| 2006/0087479 A1 | 4/2006 | Sakurai et al. |
| 2006/0087489 A1 | 4/2006 | Sakurai et al. |
| 2006/0087718 A1 | 4/2006 | Takagi et al. |
| 2006/0139308 A1 | 6/2006 | Jacobson et al. |
| 2006/0181504 A1 | 8/2006 | Kawai |
| 2006/0202949 A1 | 9/2006 | Danner et al. |
| 2006/0209008 A1 | 9/2006 | Nihei et al. |
| 2006/0214906 A1 | 9/2006 | Kobayashi et al. |
| 2006/0231401 A1 | 10/2006 | Sakurai et al. |
| 2006/0238488 A1 | 10/2006 | Nihei et al. |
| 2006/0263927 A1 | 11/2006 | Sakurai et al. |
| 2007/0013683 A1 | 1/2007 | Zhou et al. |
| 2007/0052757 A1 | 3/2007 | Jacobson |
| 2007/0091417 A1 | 4/2007 | Cao et al. |
| 2007/0091418 A1 | 4/2007 | Danner et al. |
| 2007/0097489 A1 | 5/2007 | Doshi et al. |
| 2007/0103427 A1 | 5/2007 | Zhou et al. |
| 2007/0200874 A1 | 8/2007 | Amundson et al. |
| 2007/0211002 A1 | 9/2007 | Zehner et al. |
| 2007/0285385 A1 | 12/2007 | Albert et al. |
| 2008/0024429 A1 | 1/2008 | Zehner |
| 2008/0024482 A1 | 1/2008 | Gates et al. |
| 2008/0043318 A1 | 2/2008 | Whitesides et al. |
| 2008/0048969 A1 | 2/2008 | Whitesides et al. |
| 2008/0048970 A1 | 2/2008 | Drzaic et al. |
| 2008/0054879 A1 | 3/2008 | LeCain et al. |
| 2008/0074730 A1 | 3/2008 | Cao et al. |
| 2008/0129667 A1 | 6/2008 | Zehner et al. |
| 2008/0130092 A1 | 6/2008 | Whitesides et al. |
| 2008/0136774 A1 | 6/2008 | Harris et al. |
| 2008/0150888 A1 | 6/2008 | Albert et al. |
| 2008/0218839 A1 | 9/2008 | Paolini, Jr. et al. |
| 2008/0266245 A1 | 10/2008 | Wilcox et al. |
| 2008/0273132 A1 | 11/2008 | Hsu et al. |
| 2008/0291129 A1 | 11/2008 | Harris et al. |
| 2008/0309350 A1 | 12/2008 | Danner et al. |
| 2009/0004442 A1 | 1/2009 | Danner |
| 2009/0009852 A1 | 1/2009 | Honeyman et al. |
| 2009/0034057 A1 | 2/2009 | LeCain et al. |
| 2009/0046082 A1 | 2/2009 | Jacobson et al. |
| 2009/0122389 A1 | 5/2009 | Whitesides et al. |
| 2009/0174651 A1 | 7/2009 | Jacobson et al. |
| 2009/0179923 A1 | 7/2009 | Amundson et al. |
| 2009/0195568 A1 | 8/2009 | Sjodin |
| 2009/0237773 A1 | 9/2009 | Cao et al. |
| 2009/0256799 A1 | 10/2009 | Ohkami et al. |
| 2010/0103502 A1 | 4/2010 | Jacobson et al. |
| 2010/0156780 A1 | 6/2010 | Jacobson et al. |

FOREIGN PATENT DOCUMENTS

| | | |
|---|---|---|
| EP | 1 145 072 B1 | 5/2003 |
| KR | 20090006453 | 1/2009 |
| WO | WO 00/36560 | 6/2000 |
| WO | WO 00/38000 | 6/2000 |
| WO | WO 00/67110 | 11/2000 |
| WO | WO 01/07961 | 2/2001 |

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

Au, J. et al., "Ultra-Thin 3.1-in. Active-Matrix Electronic Ink Display for Mobile Devices", IDW'02, 223 (2002).

Bach, U., et al., "Nanomaterials-Based Electrochromics for Paper-Quality Displays", Adv. Mater, 14(11), 845 (2002).

Bouchard, A. et al., "High-Resolution Microencapsulated Electrophoretic Display on Silicon", SID 04 Digest, 651 (2004).

Caillot, E. et al. "Active Matrix Electrophoretic Information Display for High Performance Mobile Devices", IDMC Proceedings (2003).

Chen, Y., et al., "A Conformable Electronic Ink Display using a Foil-Based a-Si TFT Array", SID 01 Digest, 157 (Jun. 2001).

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.
Danner, G.M. et al., "Reliability Performance for Microencapsulated Electrophoretic Displays with Simulated Active Matrix Drive", SID 03 Digest, 573 (2003).
Drzaic, P., et al., "A Printed and Rollable Bistable Electronic Display", SID 98 Digest (1998), p. 1131.
Duthaler, G., et al., "Active-Matrix Color Displays Using Electrophoretic Ink and Color Filters", SID 02 Digest, 1374 (2002).
Gates, H. et al., "A5 Sized Electronic Paper Display for Document Viewing", SID 05 Digest, (2005).
Henzen, A. et al., "An Electronic Ink Low Latency Drawing Tablet", SID 04 Digest, 1070 (2004).
Henzen, A. et al., "Development of Active Matrix Electronic Ink Displays for Handheld Devices", SID 03 Digest, 176, (2003).
Henzen, A. et al., "Development of Active Matrix Electronic Ink Displays for Smart Handheld Applications", IDW'02, 227 (2002).
Jacobson, J., et al., "The last book", IBM Systems J., 36, 457 (1997).
Jo, G-R, et al., "Toner Display Based on Particle Movements", Chem. Mater, 14, 664 (2002).
Johnson, M. et al., "High Quality Images on Electronic Paper Displays", SID 05 Digest, 1666 (2005).
Kazlas, P. et al., "Card-size Active-matrix Electronic Ink Display", Eurodisplay 2002, 259 (2002).
Kazlas, P., et al., "12.1" SVGA Microencapsulated Electrophoretic Active Matrix Display for Information Applicances, SID 01 Digest, 152 (Jun. 2001).
Kitamura, T., et al., "Electrical toner movement for electronic paper-like display", Asia Display/IDW'01, p. 1517, Paper HCS1-1 (2001).
O'Regan, B. et al., "A Low Cost, High-efficiency Solar Cell Based on Dye-sensitized colloidal TiO2 Films", Nature, vol. 353, Oct. 24, 1991, 773-740.
Pitt, M.G., et al., "Power Consumption of Microencapsulated Electrophoretic Displays for Smart Handheld Applications", SID 02 Digest, 1378 (2002).
Webber, R., "Image Stability in Active-Matrix Microencapsulated Electrophoretic Displays", SID 02 Digest, 126 (2002).
Whitesides, T. et al., "Towards Video-rate Microencapsulated Dual-Particle Electrophoretic Displays", SID 04 Digest, 133 (2004).
Wood, D., "An Electrochromic Renaissance?" Information Display, 18(3), 24 (Mar. 2002).
Yamaguchi, Y., et al., "Toner display using insulative particles charged triboelectrically", Asia Display/IDW'01, p. 1729, Paper AMD4-4 (2001).
Zehner, R. et al., "Drive Waveforms for Active Matrix Electrophoretic Displays", SID 03 Digest, 842 (2003).

* cited by examiner

ELECTROPHORETIC PARTICLES, AND PROCESSES FOR THE PRODUCTION THEREOF

REFERENCE TO RELATED APPLICATIONS

This application claims benefit of copending Application Ser. No. 61/150,827, filed Feb. 9, 2009.

This application is also related to:
(a) U.S. Pat. No. 6,822,782;
(b) U.S. Pat. No. 7,411,720;
(c) U.S. Pat. No. 7,002,728; and
(d) U.S. Pat. No. 7,247,379.

The entire contents of these patents and copending applications, and of all other U.S. patents and published and copending applications mentioned below, are herein incorporated by reference.

BACKGROUND OF INVENTION

This invention relates to electrophoretic particles (i.e., particles for use in an electrophoretic medium) and processes for the production of such electrophoretic particles. This invention also relates to electrophoretic media and displays incorporating such particles. More specifically, this invention relates to novel black or dark colored electrophoretic particles.

Particle-based electrophoretic displays, in which a plurality of charged particles move through a fluid under the influence of an electric field, have been the subject of intense research and development for a number of years. Such displays can have attributes of good brightness and contrast, wide viewing angles, state bistability, and low power consumption when compared with liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Nevertheless, problems with the long-term image quality of electrophoretic displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Patent Publication Nos. 2005/0259068, 2006/0087479, 2006/0087489, 2006/0087718, 2006/0209008, 2006/0214906, 2006/0231401, 2006/0238488, 2006/0263927 and U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. Nos. 5,961,804; 6,017,584; 6,120,588; 6,120,839; 6,262,706; 6,262,833; 6,300,932; 6,323,989; 6,377,387; 6,515,649; 6,538,801; 6,580,545; 6,652,075; 6,693,620; 6,721,083; 6,727,881; 6,822,782; 6,870,661; 7,002,728; 7,038,655; 7,170,670; 7,180,649; 7,230,750; 7,230,751; 7,236,290; 7,247,379; 7,312,916; 7,375,875; 7,411,720; and U.S. Patent Applications Publication Nos. 2005/0012980; 2006/0202949; 2007/0146310; 2007/0200795; 2008/0013155; and 2008/0013156;

(b) Capsules, binders and encapsulation processes; see for example U.S. Pat. Nos. 6,922,276; and 7,411,719;

(c) Films and sub-assemblies containing electro-optic materials; see for example U.S. Pat. No. 6,982,178; and U.S. Patent Application Publication No. 2007/0109219;

(d) Backplanes, adhesive layers and other auxiliary layers and methods used in displays; see for example U.S. Pat. No. 7,116,318; and U.S. Patent Application Publication No. 2007/0035808;

(e) Color formation and color adjustment; see for example U.S. Pat. No. 7,075,502; and U.S. Patent Application Publication No. 2007/0109219;

(f) Methods for driving displays; see for example U.S. Pat. No. 7,012,600; and U.S. Patent Application Publication No. 2006/0262060; and (g) Applications of displays; see for example U.S. Pat. No. 7,312,784; and U.S. Patent Application Publication No. 2006/0279527.

Known electrophoretic media, both encapsulated and unencapsulated, can be divided into two main types, referred to hereinafter for convenience as "single particle" and "dual particle" respectively. A single particle medium has only a single type of electrophoretic particle suspended in a suspending medium, at least one optical characteristic of which differs from that of the particles. (In referring to a single type of particle, we do not imply that all particles of the type are absolutely identical. For example, provided that all particles of the type possess substantially the same optical characteristic and a charge of the same polarity, considerable variation in parameters such as particle size and electrophoretic mobility can be tolerated without affecting the utility of the medium.) When such a medium is placed between a pair of electrodes, at least one of which is transparent, depending upon the relative potentials of the two electrodes, the medium can display the optical characteristic of the particles (when the particles are adjacent the electrode closer to the observer, hereinafter called the "front" electrode) or the optical characteristic of the suspending medium (when the particles are adjacent the electrode remote from the observer, hereinafter called the "rear" electrode (so that the particles are hidden by the suspending medium).

A dual particle medium has two different types of particles differing in at least one optical characteristic and a suspending fluid which may be uncolored or colored, but which is typically uncolored. The two types of particles differ in electrophoretic mobility; this difference in mobility may be in polarity (this type may hereinafter be referred to as an "opposite charge dual particle" medium) and/or magnitude. When such a dual particle medium is placed between the aforementioned pair of electrodes, depending upon the relative potentials of the two electrodes, the medium can display the optical characteristic of either set of particles, although the exact manner in which this is achieved differs depending upon whether the difference in mobility is in polarity or only in magnitude. For ease of illustration, consider an electrophoretic medium in which one type of particles is black and the other type white. If the two types of particles differ in polarity (if, for example, the black particles are positively charged and the white particles negatively charged), the particles will be attracted to the two different electrodes, so that if, for example, the front electrode is negative relative to the rear electrode, the black particles will be attracted to the front electrode and the white particles to the rear electrode, so that the medium will appear black to the observer. Conversely, if the front electrode is positive relative to the rear electrode, the white particles will be attracted to the front electrode and the black particles to the rear electrode, so that the medium will appear white to the observer.

If the two types of particles have charges of the same polarity, but differ in electrophoretic mobility (this type of medium may hereinafter to referred to as a "same polarity dual particle" medium), both types of particles will be attracted to the same electrode, but one type will reach the electrode before the other, so that the type facing the observer differs depending upon the electrode to which the particles are attracted. For example suppose the previous illustration is modified so that both the black and white particles are positively charged, but the black particles have the higher electrophoretic mobility. If now the front electrode is negative relative to the rear electrode, both the black and white particles will be attracted to the front electrode, but the black particles, because of their higher mobility will reach it first, so that a layer of black particles will coat the front electrode and the medium will appear black to the observer. Conversely, if the front electrode is positive relative to the rear electrode, both the black and white particles will be attracted to the rear electrode, but the black particles, because of their higher mobility will reach it first, so that a layer of black particles will coat the rear electrode, leaving a layer of white particles remote from the rear electrode and facing the observer, so that the medium will appear white to the observer: note that this type of dual particle medium requires that the suspending fluid be sufficiently transparent to allow the layer of white particles remote from the rear electrode to be readily visible to the observer. Typically, the suspending fluid in such a display is not colored at all, but some color may be incorporated for the purpose of correcting any undesirable tint in the white particles seen therethrough.

Both single and dual particle electrophoretic displays may be capable of intermediate gray states having optical characteristics intermediate the two extreme optical states already described.

Some of the aforementioned patents and published applications disclose encapsulated electrophoretic media having three or more different types of particles within each capsule. For purposes of the present application, such multi-particle media are regarded as sub-species of dual particle media.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc. Hereinafter, the term "microcavity electrophoretic display" may be used to cover both encapsulated and microcell electrophoretic displays.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

However, the electro-optical properties of encapsulated electrophoretic displays could still be improved. Typically, an electrophoretic display is designed to have black and white extreme optical states; color can then be produced by providing color filters adjacent the electrophoretic medium. Many prior art dual particle displays used titania as the white pigment and carbon black as the black pigment. However, as discussed in the aforementioned U.S. Pat. No. 7,002,728, carbon black gives rise to a number of problems in electrophoretic displays, and this patent teaches replacing carbon black with copper chromite, preferably with a polymeric shell and optionally with a silica layer between the copper chromite core and the polymeric shell.

The use of copper chromite as the black pigment in dual particle electrophoretic displays does solve many of the problems associated with carbon black pigment. However, the requirements on pigments for use in electrophoretic displays continue to increase; in particular, it has been found that achieving very low reflectance of the dark state of a display is of critical importance is securing good color saturation in color electrophoretic displays using color filter arrays, and that even the dark state provided by copper chromite pigment is less than ideal for this purpose. Accordingly, there is a need for black pigments capable of providing darker states than those provided by copper chromite, and the present invention seeks to provide such black pigments. Certain pigments provided by the present invention have the additional advantage of being free from chromium, thus eliminating hexavalent chromium which may be present as a contaminant in media containing copper chromite.

SUMMARY OF INVENTION

Accordingly, in one aspect this invention provides an electrophoretic medium comprising at least one electrically charged particle disposed in a fluid and capable of moving through the fluid on application of an electrical field to the fluid. According to the present invention, the at least one electrically charged particle comprises an inorganic black pigment having a surface area of at least about 7 $m^2/g$.

Preferred inorganic black pigments for use in the present invention are those having a surface area of at least about 10 $m^2/g$, and desirable at least about 15 $m^2/g$. As demonstrated in the Examples below, empirically it has been found that there is a strong correlation between average pigment particle size and dark state performance, with the reflectance of the dark state of the display decreasing steadily with increased surface area. Accordingly, it is desirable to use a pigment having as high a surface area as possible, having regard, of course, to the handling and safety problems which may be encountered when dealing with very small pigment particles. Preferred black pigments are metal oxides, for example magnetite, ($Fe_3O_4$), and mixed metal oxides containing two or more of iron, chromium, nickel, manganese, copper, cobalt, and possibly other metals. For suitable pigments see, for example, "Industrial Inorganic Pigments", Gunter Buxbaum and Gerhard Pfaff (eds.), Wiley-VCH, 2005. Two specific pigments which have been found to give good results are copper iron manganese oxide spinel (available from Shepherd Color Company, Cincinnati, Ohio as Shepherd Black 444) and copper chromium manganese oxide spinel (available from the same company as Black 20C920). The former material is stated by the manufacturer to have an average particle size of about 0.5 μm, a specific gravity of 5.3 and a surface area of 22 $m^2/g$, while the latter material is stated to have an average particle size of about 1.0 μm, a specific gravity of 5.1 and a surface area of 11 $m^2/g$. In general, the pigment particles of the present invention may have an average diameter of from about 0.1 to about 2 μm; if the average particle size of the particle exceeds this range, grinding or other conventional techniques may be used to reduce the particle size. The pigment particles may be coated with silica and/or have a polymer chemically bonded to, or cross-linked around the pigment particles. It is generally preferred that the polymer be chemically bonded to the particles. The polymer may comprise from about 1 to about 15 percent by weight, preferably from about 2 to about 8 percent by weight, of the pigment particles. The polymer may comprise charged or chargeable groups, for example amino groups. The polymer may also comprise a main chain and a plurality of side chains extending from the main chain, each of the side chains comprising at least about four carbon atoms. The polymer may be formed from an acrylate or a methacrylate. For further details regarding methods of forming polymer coatings on pigment particles see U.S. Pat. Nos. 6,822,782; 7,411,720; and 7,230,750.

The electrophoretic medium of the invention may be of any of the aforementioned types but preferably comprises at least one second particle having at least one optical characteristic differing from that of the pigment particles of the present invention, the second particles also having an electrophoretic mobility differing from that of the pigment particles of the present invention. The two set of particles may bear charges of opposite polarity. The second particles may be substantially white, a preferred white pigment for this purpose being titania. In the electrophoretic medium of the invention, the suspending fluid may by liquid or gaseous, and if liquid may comprise a hydrocarbon, or a mixture of a hydrocarbon and a chlorinated hydrocarbon.

The electrophoretic medium of the present invention may be of the encapsulated type and comprise a capsule wall within which the fluid and the at least one particle are retained. Such an encapsulated medium may comprise a plurality of capsules each comprising a capsule wall and the suspending fluid and at least one particle retained therein, the medium further comprising a polymeric binder surrounding the capsules.

This invention extends to an electrophoretic display comprising an electrophoretic medium of the present invention and at least one electrode disposed adjacent the electrophoretic medium for applying an electric field to the electrophoretic medium. In such an electrophoretic display, the electrophoretic medium may comprise a plurality of capsules. Alternatively, the electrophoretic medium may be of the polymer-dispersed type and comprise a plurality of droplets comprising the fluid and a continuous phase of a polymeric material surrounding the droplets. The electrophoretic display may also be of the microcell type and comprise a substrate having a plurality of sealed cavities formed therein, with the fluid and the particles retained within the sealed cavities.

In another aspect, this invention provides a an inorganic black pigment having a surface area of at least about 7 $m^2/g$ having a polymer chemically bonded to, or cross-linked around, the particle. Preferably, the polymer is chemically bonded to the particle. The polymer may comprise from about 1 to about 30 percent by weight, preferably from about 4 to about 25 percent by weight, of the particle. The polymer may comprise charged or chargeable groups, for example amino groups. The polymer may comprise a main chain and a plurality of side chains extending from the main chain, each of the side chains comprising at least about four carbon atoms. The polymer may be formed from an acrylate or a methacrylate.

The displays of the present invention may be used in any application in which prior art electro-optic displays have been used. Thus, for example, the present displays may be used in electronic book readers, portable computers, tablet computers, cellular telephones, smart cards, signs, watches, shelf labels and flash drives.

In another aspect, this invention provides a process for producing a polymer-coated pigment particle; this process comprises:

(a) reacting an inorganic black pigment particle having a surface area of at least about 7 m$^2$/g with a reagent having a functional group capable of reacting with, and bonding to, the particle, and also having a polymerizable or polymerization-initiating group, thereby causing the functional group to react with the particle surface and attach the polymerizable group thereto; and (b) reacting the product of step (a) with at least one monomer or oligomer under conditions effective to cause reaction between the polymerizable or polymerization-initiating group on the particle and the at least one monomer or oligomer, thereby causing the formation of polymer bonded to the particle.

In this process, the pigment particle may be coated with silica prior to step (a). The reagent used in step (a) may comprise a silane coupling group, for example a trialkoxysilane coupling group. The reagent may further comprises an amino group. For example, the reagent may comprise a N-[3-(trimethoxysilyl)propyl]-N'-(4-vinylbenzyl)ethylenediamine salt. The monomer or oligomer may comprise at least one acrylate or methacrylate, for example lauryl methacrylate.

DETAILED DESCRIPTION

As indicated above, the present invention provides an electrophoretic medium using an electrically charged particle comprising an inorganic black pigment having a surface area of at least about 7 m$^2$/g. This particle is desirably polymer-coated. It has been found that electrophoretic media using such inorganic black pigment particles can display intensely black dark states, with L* values in the range of about 13 to about 22 (where L* has the usual CIE definition:

$$L^* = 116(R/R_0)^{1/3} - 16,$$

where R is the reflectance and R$_0$ is a standard reflectance value), which are substantially lower than L* values obtained from copper chromite based electrophoretic media. The white states of the electrophoretic media of the present invention are only slightly less bright than those copper chromite based media, so that the media of the present invention have a greater dynamic range (the difference between the extreme dark and white states, expressed in L* units). Furthermore, since simulations suggest that improvements in dark state are more important than improvements in white states for optimizing color saturation in color filter array based displays, the media of the present invention will have superior color saturation in such displays, and are also expected to have more pleasing color characteristics.

The following Examples are now given, though by way of illustration only, to show preferred reagents, conditions and techniques used in the processes and electrophoretic media of the present invention.

EXAMPLE 1

Preparation of Polymer-coated Inorganic Pigment Particles

The raw pigments (Shepherd Black 444 and Shepherd Black 20C920) were milled in water to reduce the average particle size to about 0.3 μm for the former pigment and about 0.5 μm for the latter. The milled pigments were then surface functionalized using N-[3-(trimethoxysilyl)propyl]-N'-(4-vinylbenzyl)ethylenediamine bishydrochloride (obtained from United Chemical Technologies) using substantially the same procedure as in the aforementioned U.S. Pat. No. 6,822,782, Example 26. The amount of surface functionalization achieved was estimated by thermogravimetric analysis, which indicated the presence of 4-10% of volatile (organic) material for Black 444 and 1.1-1.3% of volatile (organic) material for Black 20C920.

EXAMPLE 2

Preparation of Electrophoretic Media Containing Polymer-coated Inorganic Pigment Particles Standard solutions of the two black pigments produced in Example 1 and of various other components of an electrophoretic medium internal phase were prepared and mixed in a 250 mL plastic bottle to form an internal phase as follows:

| Component | Black 444 based pigment | Black 20C920 based pigment |
| --- | --- | --- |
| 55% Black Pigment/Isopar E | 25.88 g | 41.14 g |
| 60 wt % polymer-coated titania/Isopar E: | 106.77 g | 94.29 g |
| 13 wt % polyisobutylene/Isopar E: | 7.73 g | 6.7 g |
| 10 wt % Solsperse 17K/Isopar E: | 23.49 g | 19.01 g |
| Isopar E: | 10.12 g | 14.86 g |

A solution of gelatin (10 g) in deionized water (240 g) having a temperature of 42.5° C. was prepared in a 500 mL jacketed reactor and equipped with a stirrer and a dropping funnel. Under vigorous stirring, the internal phase prepared as described above was added over a period of 1 minute using an addition funnel with an outlet below the surface of the gelatin solution. Immediately after this addition had been completed, the stirring rate was increased to 750 rpm to produce internal phase droplets in the desired size range, and this level of stirring was maintained for 1 hour. At the end of this period, a solution of gum acacia (10 g) in water (251.6 g) having a temperature of 40° C. was added to the internal phase dispersion, and the pH of the resultant mixture was adjusted to 4.9 by addition of 10 weight percent acetic acid. The temperature of the reaction mixture was then lowered in stages to 8° C.; when its temperature reached 10° C., glutaraldehyde (2.5 g of a 50% solution in water) was added. The reaction mixture was then warmed to 25° C. and allowed to remain at this temperature overnight to produce a dispersion of microcapsules in an aqueous medium. The microcapsules were isolated by sedimentation, washed with deionized water and sieved using sieves with 45 and 20 μm mesh. Analysis of the resulting capsules showed a mean size of about 40 μm, with more than 97% of the capsule volume being in capsules having a diameter of from 20 to 60 μm.

EXAMPLE 3

Conversion of Capsules to Experimental Displays

The capsules prepared in Example 2 were converted to a slurry of capsules in a polymeric binder as follows. The capsules were allowed to settle for at least one hour, and some but not all of the excess water was poured off. The bottle containing the capsules was shaken to re-disperse the capsules in water and the pH of the dispersion adjusted to 9.0-9.5 with ammonium hydroxide. The bottle was again shaken to re-disperse the capsules and capsule solids were measured by thermogravimetric analysis. The capsules were concentrated by centrifugation and supernatant liquid poured off. Sufficient polymeric binder to produce and 8:1 w/w capsule to binder ratio, hydroxypropylmethylcellulose (0.2% of the slurry mass), Triton X100 surfactant (0.03% of the slurry mass) and water were added to produce a slurry containing 33% by weight of capsule solids, and the resultant slurry vigorously shaken to disperse the concentrated capsules from the bottom of the container. The bottle containing the slurry was then placed on a roll mill and rolled for a minimum of 10 hours.

The resultant slurry was then bar-coated, using a 4 mil (101 μm) coating gap, on to the indium tin oxide (ITO) coated surface of a poly(ethylene terephthalate) (PET)/ITO film, and the coated film dried in a conveyor oven for approximately 2 minutes at 60° C. to produce a capsule (electro-optic) layer approximately 18 μm thick. Separately, a custom polyurethane lamination adhesive of the type described in U.S. Pat. No. 7,012,735, doped with 180 ppm of tetrabutylammonium hexafluorophosphate, was coated at a thickness of about 25 μm on to a release sheet and the resultant release sheet/lamination adhesive sub-assembly was laminated, using a hot roll laminator, to the PET/ITO/capsule layer sub-assembly, with the lamination adhesive in contact with the capsule layer. The resulting front plane laminate (see the aforementioned U.S. Pat. No. 6,982,178) was then cut into two inch (51 mm) squares, the release sheet removed, and the lamination adhesive hot roll laminated to two inch (51 mm) square backplanes comprising a graphite electrode on a flexible polymer sheet. Appropriate electrical conductors were attached to the graphite and ITO electrodes to produce experimental single pixel displays.

The electro-optic properties of the experimental displays thus prepared were tested using 15 V, 240 millisecond drive pulses. Each display was first switched repeatedly between its dark and white states, then finally driven to one of its dark and white states using a single 15 V, 240 millisecond drive pulse. The display was then allowed to remain in the same state with no drive pulse applied for two minutes (this two minute rest period serves to remove the effects of certain short term changes appearing in some electrophoretic displays) and then its reflectivity was measured and converted to L* units. The dark state results are shown in the FIG. 1 of the accompanying drawings and the white state results in FIG. 2. In both cases results for control displays using black pigments prepared in the same manner from copper chromite are provided for comparison.

Figure 1:
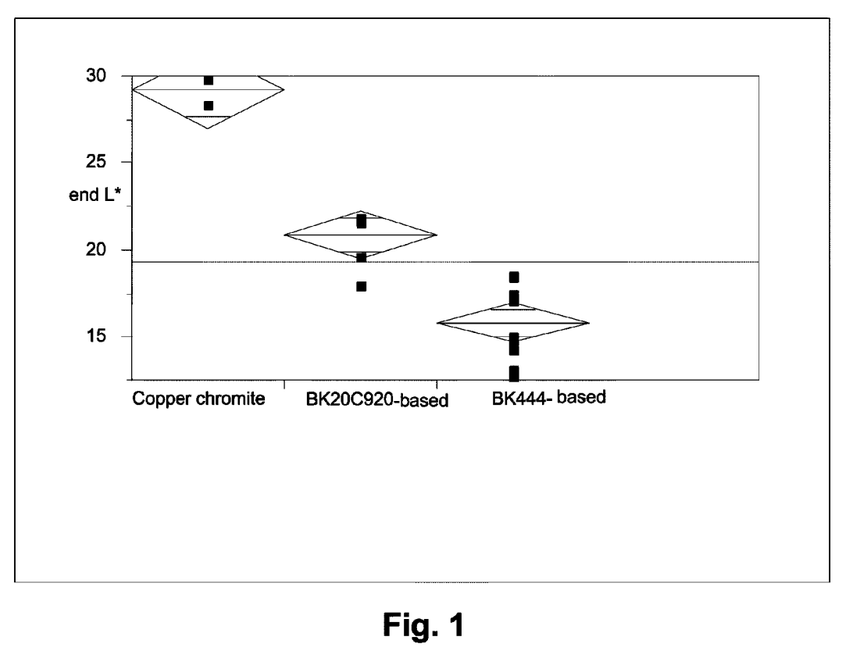
FIGS. 1 and 2 of the accompanying drawings show respectively the dark and light state reflectance values of certain experimental displays of the present invention, and of a control display, obtained in the experiments described in Example 3 below.
Figure 2:
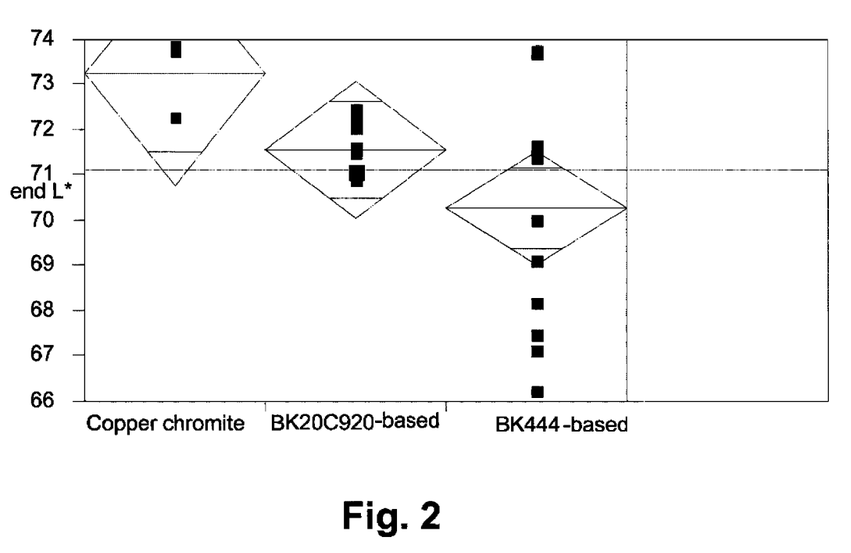

From FIGS. 1 and 2, it will be seen that the two pigments of the present invention produced substantially darker dark states than the prior art copper chromite pigment, while suffering only a modest drop in white state reflectivity. Consequently, the displays of the present invention had a substantially greater contrast ratio (14:1 for the Black 20C920 based pigment, and 20:1 for the Black 444 based pigment) than that of the copper chromite based pigment (8:1). The Black 444 based pigment also had the advantage of providing a chromium-free pigment.

EXAMPLE 4

Correlation of Dark State of Experimental Displays with Pigment Particle Size

Figure 3:
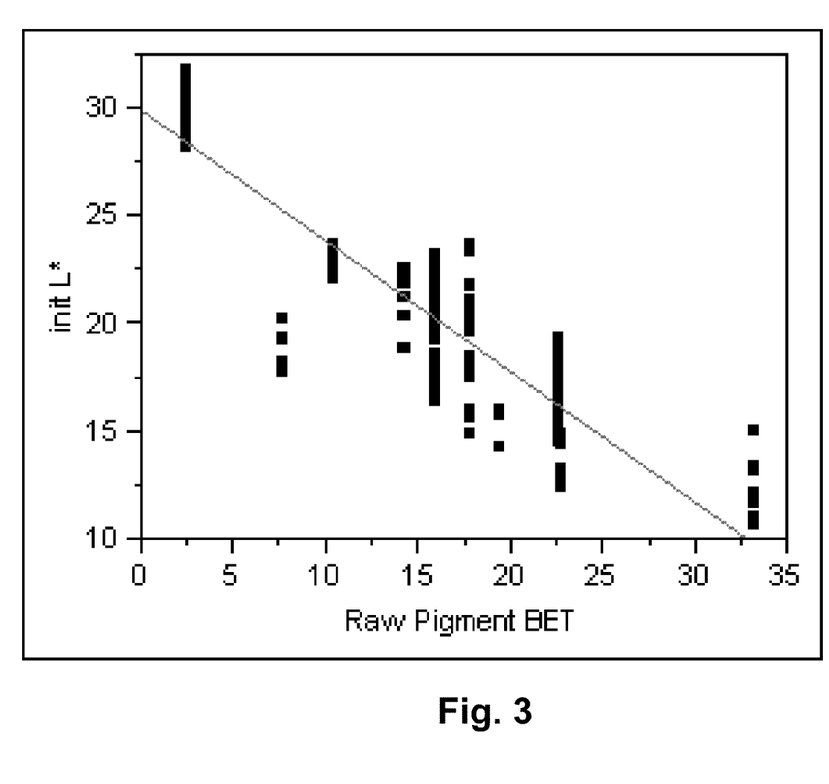
FIG. 3 is a graph of dark state against surface area per unit weight of the dark pigment for certain experimental displays of the present invention obtained in the experiments described in Example 4 below.

A series of black pigments having a wide range of surface area per unit weight measurements were obtained from Shepherd Color Company, and their surface areas per unit weight measured by the conventional BET (nitrogen gas absorption) technique. The black pigments were then formulated into experimental single pixel displays in the same way as in Examples 1-3, and the dark states of the displays measured in the same way as in Example 3. FIG. 3 is a graph of dark state against surface area per unit weight (the abscissa values in FIG. 3 are in square meters per gram). The leftmost experimental points in FIG. 3 are copper chromite particles, the next two sets are samples of Black 20C920 pigment having differing surface areas, and the remaining sets are all samples of Black 444 having differing surfaces areas. It will be seen from the linear regression line provided in FIG. 3 that there a very strong correlation between increased surface area and improved dark state (i.e., lower L* values) and that this correlation appears to be largely independent of the exact chemical nature of the pigment, as least for the metal oxide pigments used in these experiments.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. An electrophoretic medium comprising at least one electrically charged particle disposed in a fluid and capable of moving through the fluid on application of an electrical field to the fluid, the at least one electrically charged particle comprising an inorganic black pigment having a surface area of at least about 7 $m^2/g$.

2. An electrophoretic medium according to claim 1 wherein the inorganic black pigment has a surface area of at least about 10 $m^2/g$.

3. An electrophoretic medium according to claim 2 wherein the inorganic black pigment has a surface area of at least about 15 $m^2/g$.

4. An electrophoretic medium according to claim 1 wherein the inorganic black pigment comprises magnetite or a mixed metal oxide containing two or more of iron, chromium, nickel, manganese, copper and cobalt.

5. An electrophoretic medium according to claim 4 wherein the inorganic black pigment comprises a copper iron manganese oxide spinel.

6. An electrophoretic medium according to claim 4 wherein the inorganic black pigment comprises a copper chromium manganese oxide spinel.

7. An electrophoretic medium according to claim 1 wherein the inorganic black pigment has a polymer chemically bonded to, or cross-linked around the pigment particles.

8. An electrophoretic medium according to claim 7 wherein the polymer comprises from about 1 to about 15 per cent by weight of the pigment particles.

9. An electrophoretic medium according to claim 7 wherein the polymer comprises a main chain and a plurality of side chains extending from the main chain, each of the side chains comprising at least about four carbon atoms.

10. An electrophoretic medium according to claim 1 further comprising at least one second particle having at least one optical characteristic differing from that of the inorganic black pigment particles, the second particles also having an electrophoretic mobility differing from that of the inorganic black pigment particles.

11. An electrophoretic medium according to claim 10 wherein the two sets of particles bear charges of opposite polarity.

12. An electrophoretic medium according to claim 1 comprising a capsule wall within which the fluid and the inorganic black pigment particles are retained.

13. An electrophoretic medium according to claim 12 further comprising a polymer binder surrounding the capsules.

14. An electrophoretic display comprising an electrophoretic medium according to claim 1 and at least one electrode disposed adjacent the electrophoretic medium for applying an electric field to the electrophoretic medium.

15. An electronic book reader, portable computer, tablet computer, cellular telephone, smart card, sign, watch, shelf label or flash drive comprising a display according to claim 14.

16. A process for producing a polymer-coated pigment particle; this process comprises:
  (a) reacting an inorganic black pigment particle having a surface area of at least about 7 $m^2/g$ with a reagent having a functional group capable of reacting with, and bonding to, the particle, and also having a polymerizable or polymerization-initiating group, thereby causing the functional group to react with the particle surface and attach the polymerizable group thereto; and
  (b) reacting the product of step (a) with at least one monomer or oligomer under conditions effective to cause reaction between the polymerizable or polymerization-initiating group on the particle and the at least one monomer or oligomer, thereby causing the formation of polymer bonded to the particle.

17. A process according to claim 16 wherein the pigment particles is coated with silica prior to step (a).

18. A process according to claim 16 wherein the reagent used in step (a) comprises a silane coupling group.

19. A process according to claim 18 wherein the reagent further comprises an amino group.

20. A process according to claim 16 wherein the monomer or oligomer comprises at least one acrylate or methacrylate.

* * * * *